United States Patent
Wild et al.

(10) Patent No.: US 10,341,154 B2
(45) Date of Patent: Jul. 2, 2019

(54) METHOD FOR MULTIPLE ACCESS TRANSMISSION IN A WIRELESS COMMUNICATION SYSTEM, AND A TRANSMITTER APPARATUS AND A BASE STATION THEREFOR

(71) Applicant: Alcatel Lucent, Boulogne Billancourt (FR)

(72) Inventors: Thorsten Wild, Stuttgart (DE); Xiaojie Wang, Stuttgart (DE); Frank Schaich, Stuttgart (DE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/515,381

(22) PCT Filed: Sep. 21, 2015

(86) PCT No.: PCT/EP2015/071552
§ 371 (c)(1),
(2) Date: Mar. 29, 2017

(87) PCT Pub. No.: WO2016/050543
PCT Pub. Date: Apr. 7, 2016

(65) Prior Publication Data
US 2017/0244587 A1 Aug. 24, 2017

(51) Int. Cl.
*H04J 11/00* (2006.01)
*H04B 1/00* (2006.01)
(Continued)

(52) U.S. Cl.
CPC ........ *H04L 27/2627* (2013.01); *H04L 1/0026* (2013.01); *H04L 25/03834* (2013.01);
(Continued)

(58) Field of Classification Search
CPC ............... H04L 27/2627; H04L 1/0026; H04L 25/03834; H04L 5/0023; H04L 27/264;
(Continued)

(56) References Cited

U.S. PATENT DOCUMENTS 7,627,056 B1 * 12/2009 Harris ...................... H04L 1/004
375/260
9,900,886 B2   2/2018 Wild et al.
(Continued)

FOREIGN PATENT DOCUMENTS

EP          2843892      3/2015

OTHER PUBLICATIONS

Frank Schaich et al., "Waveform contenders for 5G—OFDM vs. FBMC vs. UFMC" 6th International Symposium on Communications, Control and Signal Processing, IEEE, pp. 457-460, XP032627152, 2014.
International Search Report for PCT/EP2015/071552 dated Nov. 2, 2015.

*Primary Examiner* — Edan Orgad
*Assistant Examiner* — Vanneilian Lalchinthang
(74) *Attorney, Agent, or Firm* — Fay Sharpe LLP

(57) ABSTRACT

The invention concerns a method for conditioning a multi-carrier transmit signal using a first or a second set of subgroups of time-frequency resource elements, with a subgroup of the first set of subgroups and a subgroup of the second set of subgroups having common time or frequency resources and being neighbored in time or frequency, wherein a first filter module (FILT1) filters the first set of subgroups using a first filter characteristic by a first set of filter coefficients, and a second filter module (FILT2) filters the second set of subgroups using a second filter characteristic by a second set of filter coefficients, and a base station and a transmitter apparatus (TA) therefor.

14 Claims, 11 Drawing Sheets

(51) Int. Cl.
*H04L 27/26* (2006.01)
*H04L 25/03* (2006.01)
*H04L 1/00* (2006.01)
*H04W 72/04* (2009.01)
*H04L 1/20* (2006.01)

(52) U.S. Cl.
CPC ........... *H04L 27/264* (2013.01); *H04W 72/04* (2013.01); *H04L 1/20* (2013.01)

(58) Field of Classification Search
CPC ...... H04L 1/20; H04L 5/0039; H04J 11/0066; H04W 72/04; H04B 7/0617
USPC .......................................................... 370/330
See application file for complete search history.

(56) References Cited

U.S. PATENT DOCUMENTS

| | | | |
|---|---|---|---|
| 2007/0053453 A1* | 3/2007 | Yeh | H04L 25/03057 375/260 |
| 2009/0103595 A1* | 4/2009 | Watanabe | G01S 7/526 375/219 |
| 2009/0296784 A1* | 12/2009 | Kirsch | H04B 1/1036 375/130 |
| 2010/0246558 A1* | 9/2010 | Harel | H04L 5/0023 370/344 |
| 2011/0110304 A1* | 5/2011 | Kuchi | H04L 5/0023 370/328 |
| 2013/0163542 A1* | 6/2013 | Fettweis | H04W 72/044 370/329 |
| 2016/0050094 A1* | 2/2016 | Ryu | H04L 27/2636 370/329 |

* cited by examiner

METHOD FOR MULTIPLE ACCESS TRANSMISSION IN A WIRELESS COMMUNICATION SYSTEM, AND A TRANSMITTER APPARATUS AND A BASE STATION THEREFOR

FIELD OF THE INVENTION

The invention relates to a method for conditioning a multicarrier transmit signal using a transmitter apparatus, and a transmitter apparatus and a base station operable to perform said method.

BACKGROUND

This section introduces aspects that may be helpful in facilitating a better understanding of the invention. Accordingly, the statements of this section are to be read in this light and are not to be understood as admission about what is in the prior art.

In 3GPP LTE (3GPP=3rd Generation Partnership Project, LTE=Long Term Evolution) for example it is suggested to use so-called fragmented bands by carrier aggregation for increasing the data rates in a wireless communication system. Thereby, the wireless communication system may be allowed to use a frequency band or a part of a frequency band of another wireless communication system, when one base station or several base stations of the other wireless communication system is/are not operated at full capacity. In such a case, an emission of a radio frequency signal by the wireless communication system in a frequency band still used by the other wireless communication must be prevented without fail.

Classical multicarrier signals such as OFDM multicarrier signals (OFDM=Orthogonal Frequency Division Multiplexing) are based on time domain signals having a rectangular shape. The rectangular shape in the time domain is associated with a shape of a so-called sinc-function in the frequency domain. Thereby, subcarriers of a multicarrier signal have rather high side-lobe levels. When using an OFDM multicarrier signal for the above mentioned application in fragmented spectrum, guard bands separating the fragmented sub-bands of the fragmented spectrum must be sufficiently large.

For upcoming machine-to-machine communication with low cost radio transmitters, synchronization requirements with respect to timing and frequency stability will likely be less stringent than for radio transmitters which are currently applied in cellular radio communication systems. Also so-called CoMP transmissions (CoMP=coordinated multipoint) exhibit timing offsets and frequency offset, when radio frequency signals propagate for example from two or more base stations via different propagation paths to a user terminal. The timing offsets may cause inter-carrier interference. By using conventional OFDM (OFDM=Orthogonal Frequency Division Multiplexing) subcarriers transmission quality degrades fast, when the timing offset exceeds the so-called cyclic prefix.

In so-called 5G future wireless systems, it is envisaged to relax synchronicity in terms of time and frequency between uplink users in order to reduce signaling overhead and device battery consumption. As a consequence, especially small packet messages and control information can be transmitted more efficiently than with strict synchronicity implying bulky random access procedures and closed-loop timing advance control.

SUMMARY

It is an object of the invention to provide in future wireless systems a waveform structure using multi-carrier modulation, which provides high performance and robustness for relaxed time-frequency alignment.

Such a waveform structure shall be well suited for contention based access with low signaling overhead, as such a traffic type, e.g. generated by machine-type-communication is anticipated to play a large role in future wireless systems, as e.g. 5G wireless systems.

OFDM is known to be sensitive against time-frequency misalignments, thus should not be used for the purpose of relaxed synchronicity.

A filtering of multi-carriers, as e.g. applied in the so-called UFMC (UFMC=Universal Filtered Multi Carrier) introduces additional robustness and thus is better suited than OFDM for the purpose of relaxed synchronicity. Proposed solutions for filtering of multi-carriers so far introduce either a fixed waveform parameter setting or user-specific waveform adaptation. The user-specific waveform adaptation requires control signaling, introducing additional overhead to the system. Especially when only small information packets are to be transmitted this control signal overhead is disadvantageous, costing air interface resources and battery power.

A basic idea according to embodiments of the invention is to introduce a heterogeneous waveform pattern with alternating parameters known at both ends of the wireless link.

In simple forms of the heterogeneous waveform pattern, two parameter settings are alternated time-slot wise or in the form of a "chessboard" pattern over time and frequency.

The different waveform patterns have different levels of spectral sidelobe suppression, thus causing a different amount of inter symbol interference (ISI) and inter carrier interference (ICI) to time or frequency neighbored resources. Wireless devices may then be assigned to resources with different waveform patterns depending on the quality of the wireless link.

The object of the invention is thus achieved by a method for conditioning a multicarrier transmit signal using a transmitter apparatus which comprises a composer module, a first filter module, a second filter module, and a transmitter module, wherein the composer module composes a multicarrier transmit signal using a first or a second set of subgroups time-frequency resource elements, with at least one subgroup of the first set of subgroups and at least one subgroup of the second set of subgroups having common time or frequency resources and being neighbored in time or frequency, the first filter module filters the first set of subgroups of time-frequency resource elements using a first filter characteristic by a first set of filter coefficients in case the multicarrier transmit signal is composed of the first set of subgroups of time-frequency resource elements, the second filter module filters the second set of subgroups of time-frequency resource elements using a second filter characteristic by a second set of filter coefficients, in case the multicarrier transmit signal is composed of the second set of subgroups of time-frequency resource elements, and the transmitter module transmits the multicarrier transmit signal.

The object of the invention is furthermore achieved by a transmitter apparatus for conditioning a multicarrier transmit signal, the transmitter apparatus comprising a composer module operable to compose a multicarrier transmit signal using a first or a second set of subgroups of time-frequency resource elements, with at least one subgroup of the first set of subgroups and at least one subgroup of the second set of subgroups having common time or frequency resources and being neighbored in time or frequency, a first filter module operable to filter the first set of subgroups of time-frequency resource elements using a first filter characteristic by a first set of filter coefficients, a second filter module operable to filter the second set of subgroups of time-frequency resource elements using a second filter characteristic by a second set of filter coefficients, and a transmitter module operable to transmit the multicarrier transmit signal.

The object of the invention is furthermore achieved by a base station for enabling a transmitter apparatus of a wireless device to condition a multicarrier transmit signal, wherein the base station is operable to transmit information to the wireless device about a first set of subgroups of time-frequency resource elements which are used by the wireless device if the wireless device experiences a link quality being lower than a threshold, and the base station is operable to transmit information to the wireless device about a second set of subgroups of time-frequency resource elements which are used by the wireless device if the wireless device experiences a link quality being higher than the threshold, with at least one subgroup of the first set of subgroups and at least one subgroup of the second set of subgroups having common time or frequency resources and being neighbored in time or frequency.

In an embodiment of the invention, the first filter module filters the first set of subgroups of time-frequency resource elements using a first filter characteristic having a first level of spectral sidelobe suppression in case the multicarrier transmit signal is composed of the first set of subgroups of time-frequency resource elements, and the second filter module filters the second set of subgroups of time-frequency resource elements using a second filter characteristic having a second level of spectral sidelobe suppression, said second level of spectral sidelobe suppression being higher than the first level of spectral sidelobe suppression, in case the multicarrier transmit signal is composed of the second set of subgroups of time-frequency resource elements.

In an embodiment of the invention, subgroups of the first set of subgroups of time-frequency resource elements are alternated in time with subgroups of the second set of subgroups of time-frequency resource elements in order to come to a simple heterogeneous waveform pattern.

In an embodiment of the invention, subgroups of the first set of subgroups of time-frequency resource elements are alternated in time and frequency with subgroups of the second set of subgroups of time-frequency resource elements in order to come to a simple heterogeneous waveform pattern.

In an embodiment of the invention, if a wireless device comprising the transmitter apparatus for conditioning the multicarrier transmit signal experiences a link quality being lower than a threshold, then the transmitter apparatus uses the first set of subgroups of time-frequency resource elements, and if a wireless device comprising the transmitter apparatus for conditioning the multicarrier transmit signal experiences a link quality being higher than a threshold, then the transmitter apparatus uses the second set of subgroups of time-frequency resource elements.

In an embodiment of the invention, said link quality is at least one of a group of a signal-to-noise-plus-inter-cell-interference, a channel quality indicator (CGI) corresponding to a preferred modulation and coding scheme (MCS), an expected data throughput, a quality indicator based on log-likelihood ratios, a quality indicator based on the number of successful CRC checks, a quality indicator based on error vector magnitudes, a quality indicator based on mean squared errors, and a quality indicator based on frame, block, symbol or bit error rates.

In an embodiment of the invention, said link quality is based on at least one of a group of downlink pilot measurements, path loss measurements and channel quality information.

In an embodiment of the invention, said wireless device comprising the transmitter apparatus for conditioning the multicarrier transmit signal determines whether it experiences a link quality being lower than said threshold or being higher than said threshold.

In an embodiment of the invention, a base station determines whether said wireless device comprising the transmitter apparatus for conditioning the multicarrier transmit signal experiences a link quality being lower than said threshold or being higher than said threshold.

In an embodiment of the invention, said first and second filter modules are finite impulse response filter modules.

In an embodiment of the invention, said second filter modules provide an optimized ratio of total in-band signal power to total inter-symbol-interference, inter-carrier-interference and out-of-band leakage power.

In an embodiment of the invention, said first filter modules contains only one filter coefficient in time domain being different from zero.

Further developments of the invention can be gathered from the following description.

BRIEF DESCRIPTION OF THE FIGURES

In the following the invention will be explained further making reference to the attached drawings.

DESCRIPTION OF THE EMBODIMENTS

The invention is described in the following within the framework of enhancements of 3GPP LTE. However the invention is not restricted to enhancements of 3GPP LTE, but can in principle be applied in other networks that can use multicarrier transmission, like e.g. 5G as next generation wireless, or mobile communication networks with enhancements of different standards, for example, enhancements of a Worldwide Inter-operability for Microwave Access (WI-MAX) network IEEE 802.16 or enhancements of a Wireless Local Area Network (WLAN) IEEE 802.11. In the following, instead of the term eNodeB used in LTE, the more general term base station is used.

Various example embodiments will now be described more fully with reference to the accompanying drawings in which some example embodiments are illustrated. In the figures, the thicknesses of lines, layers or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers and signs refer to like or similar elements throughout the description of the figures.

As used herein, the term, "or" refers to a non-exclusive or, unless otherwise indicated (e.g., "or else" or "or in the alternative").

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, components, but do not preclude the presence or addition of one or more other features, integers, steps, operations, elements, components or groups thereof.

Unless otherwise defined, all terms, including technical and scientific terms, used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
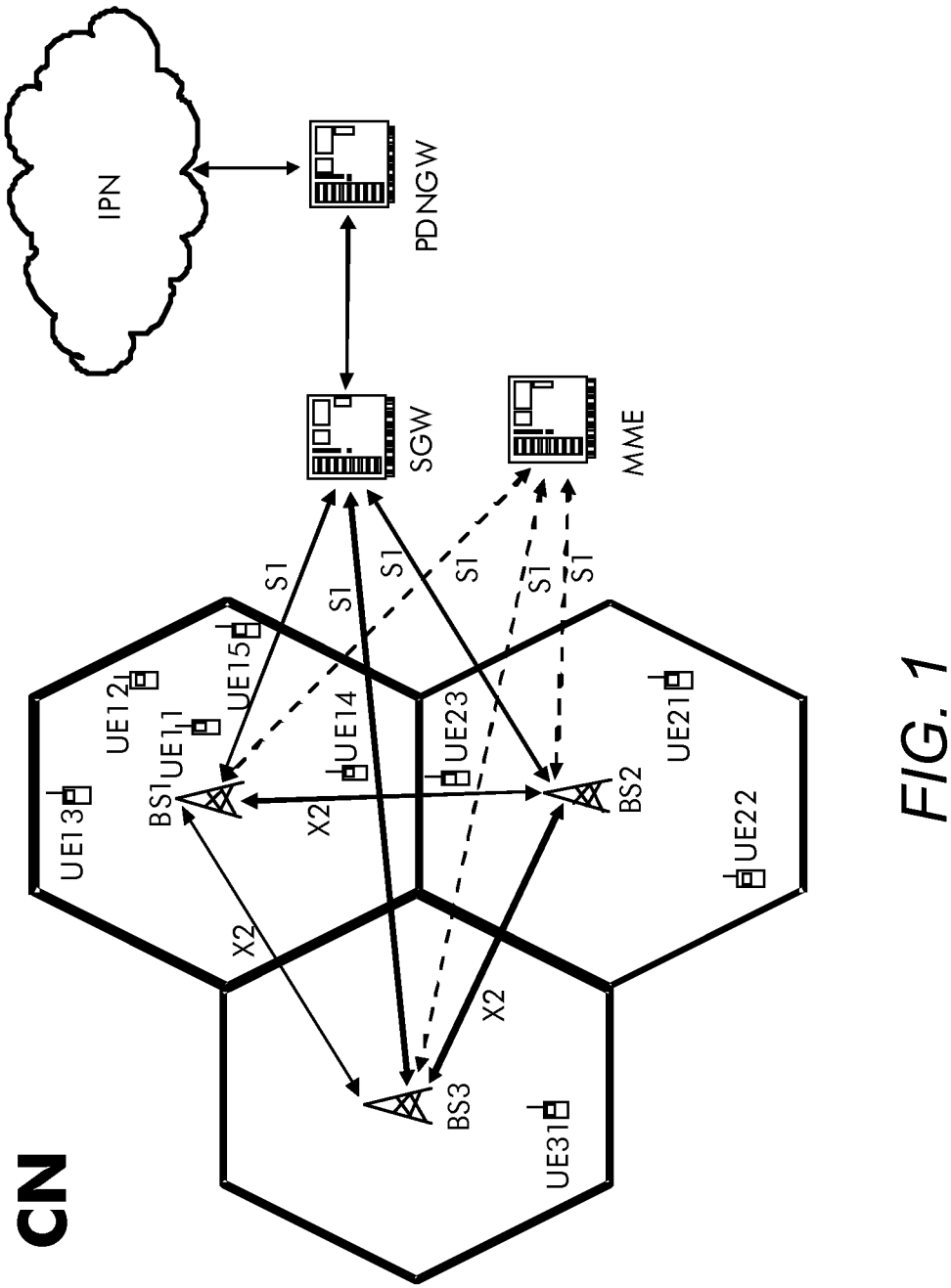
FIG. 1 schematically shows a communication network in which the invention can be implemented.

FIG. 1 shows as an example of a communication network in which the invention can be implemented a communication network CN according to the standard 3GPP LTE.

Said communication network CN comprises base stations BS1-BS3, user terminals UE11-UE31, a serving gateway SGW, a packet data network gateway PDNGW, and a mobility management entity MME.

The user terminals UE11-UE15 are connected via radio connections to the base station BS1, the user terminals UE21-UE23 are connected via radio connections to the base station BS2, and the user terminal UE31 is connected via a radio connection to the base station BS3. In future evolutions of LTE, each of the user terminals UE11-UE31 can also be connected via radio connections to multiple of said base stations BS1-BS3.

The base stations BS1-BS3 are in turn connected to the serving gateway SGW and to the mobility management entity MME, i.e. to the evolved packet core (EPC), via the so-called S1 interface.

The base stations BS1-BS3 are connected among each other via the so-called X2 interface.

The serving gateway SGW is connected to the packet data network gateway PDNGW, which is in turn connected to an external IP network IPN.

The S1 interface is a standardized interface between one of the base stations BS1-BS3, i.e. an eNodeB in this example, and the Evolved Packet Core (EPC). The S1 interface has two flavours, S1-MME for exchange of signaling messages between one of the base stations BS1-BS3 and the mobility management entity MME and S1-U for the transport of user datagrams between one of the base stations BS1-BS3 and the serving gateway SGW.

The X2 interface is added in 3GPP LTE standard primarily in order to transfer the user plane signal and the control plane signal during handover.

The serving gateway SGW performs routing of the IP user data between the base stations BS1-BS3, and the packet data network gateway PDNGW. Furthermore, the serving gateway SGW serves as a mobile anchor point during handover either between different base stations, or between different 3GPP access networks.

The packet data network gateway PDNGW represents the interface to the external IP network IPN and terminates the so-called EPS bearer (EPS=Evolved Packet System) which is established between a user terminal and the respective serving base station BS1-BS3.

The mobility management entity MME performs tasks of the subscriber management and the session management, and also performs the mobility management during handover between different access networks.

Figure 2:
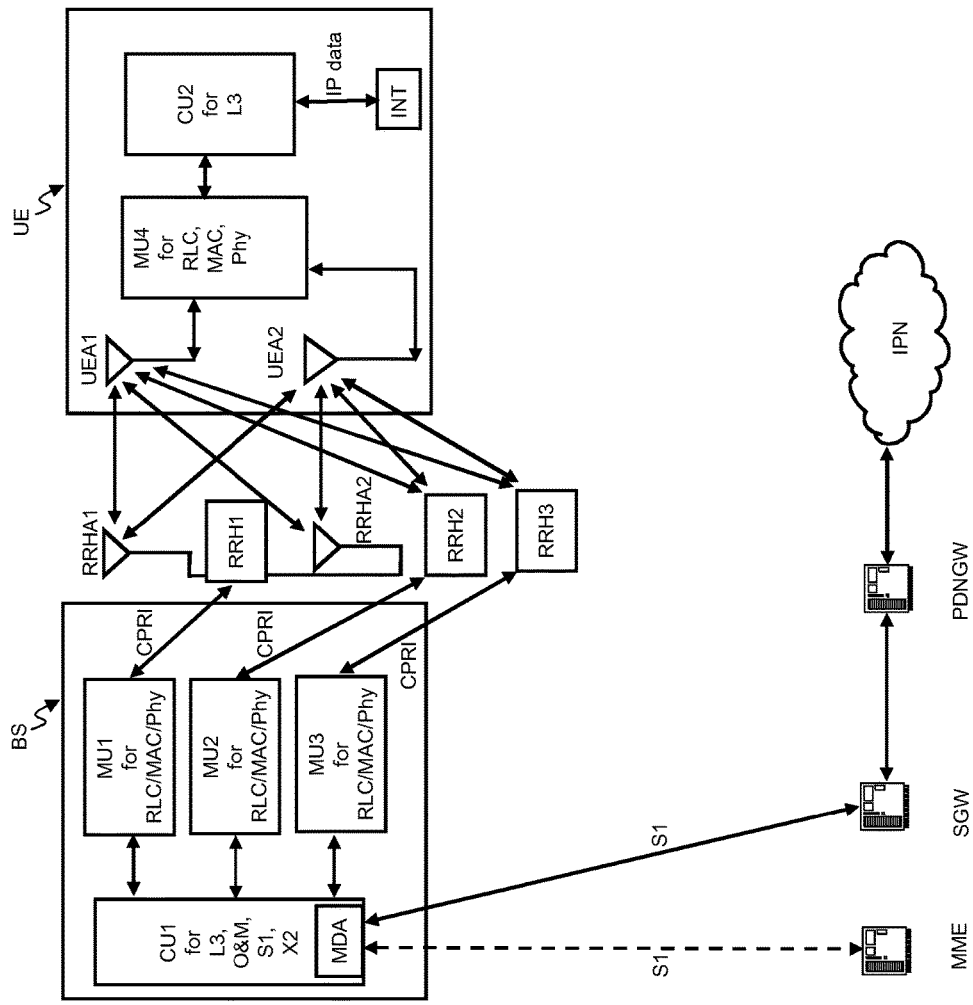
FIG. 2 schematically shows the structure of a user terminal and a base station in which the invention can be implemented.

FIG. 2 schematically shows the structure of a user terminal UE and a base station BS in which the invention can be implemented.

The base station BS comprises by way of example three modem unit boards MU1-MU3 and a control unit board CU1, which in turn comprises a media dependent adapter MDA.

The three modem unit boards MU1-MU3 are connected to the control unit board CU1, and to a respective remote radio head RRH1, RRH2, or RRH3 via a so-called Common Public Radio Interface (CPRI).

Each of the remote radio heads RRH1, RRH2, and RRH3 is connected by way of example to two remote radio head antennas RRHA1 and RRHA2 for transmission and reception of data via a radio interface. Said two remote radio head antennas RRHA1 and RRHA2 are only depicted for the remote radio head RRH1 in FIG. 2 for the sake of simplicity.

The media dependent adapter MDA is connected to the mobility management entity MME and to the serving gateway SGW and thus to the packet data network gateway PDNGW, which is in turn connected to the external IP network IPN.

The user terminal UE comprises by way of example two user terminal antennas UEA1 and UEA2, a modem unit board MU4, a control unit board CU2, and interfaces INT.

The two user terminal antennas UEA1 and UEA2 are connected to the modem unit board MU4. The modem unit board MU4 is connected to the control unit board CU2, which is in turn connected to interfaces INT.

The modem unit boards MU1-MU4 and the control unit boards CU1, CU2 may comprise by way of example Field Programmable Gate Arrays (FPGA), Digital Signal Processors (DSP), micro processors, switches and memories, like e.g. Double Data Rate Synchronous Dynamic Random Access Memories (DDR-SDRAM) in order to be enabled to perform the tasks described below.

The remote radio heads RRH1, RRH2, and RRH3 comprise the so-called radio equipment, e.g. modulators and amplifiers, like delta-sigma modulators (DSM) and switch mode amplifiers.

In downlink, IP data received from the external IP network IPN are transmitted from the packet data network gateway PDNGW via the serving gateway SGW to the media dependent adapter MDA of the base station BS on an EPS bearer. The media dependent adapter MDA allows for a connectivity to different media like e.g. fiber or electrical connection.

The control unit board CU1 performs tasks on layer 3, i.e. on the radio resource control (RRC) layer, such as measurements and cell reselection, handover and RRC security and integrity.

Furthermore, the control unit board CU1 performs tasks for Operation and Maintenance, and controls the S1 interfaces, the X2 interfaces, and the Common Public Radio Interface.

The control unit board CU1 sends the IP data received from the serving gateway SGW to a modem unit board MU1-MU3 for further processing.

The three modem unit boards MU1-MU3 perform data processing on layer 2, i.e. on the PDCP layer (PDCP=Packet Data Convergence Protocol) which is e.g. responsible for header compression and ciphering, on the RLC layer (RLC=Radio Link Control) which is e.g. responsible for segmentation and Automatic Repeat Request (ARQ), and on the MAC layer (MAC=Media Access Control) which is responsible for MAC multiplexing and Hybrid Automatic Repeat Request (HARQ).

Furthermore, the three modem unit boards MU1-MU3 perform data processing on the physical layer, i.e. coding, modulation, and antenna and resource-block mapping.

The coded and modulated data are mapped to antennas and resource blocks and are sent as transmission symbols from the modem unit board MU1-MU3 over the Common Public Radio Interface to the respective remote radio head RRH1, RRH2, or RRH3, and the respective remote radio head antenna RRHA1, RRHA2 for transmission over an air interface.

The Common Public Radio Interface (CPRI) allows the use of a distributed architecture where base stations BS, containing the so-called radio equipment control, are connected to remote radio heads RRH1, RRH2, and RRH3 preferably via lossless fibre links that carry the CPRI data. This architecture reduces costs for service providers because only the remote radio heads RRH1, RRH2, and RRH3 containing the so-called radio equipment, like e.g. amplifiers, need to be situated in environmentally challenging locations. The base stations BS can be centrally located in less challenging locations where footprint, climate, and availability of power are more easily managed.

The user terminal antennas UEA1, UEA2 receive the transmission symbols, and provide the received data to the modem unit board MU4.

The modem unit board MU4 performs data processing on the physical layer, i.e. antenna and resource-block demapping, demodulation and decoding.

Furthermore, the modem unit board MU4 performs data processing on layer 2, i.e. on the MAC layer (MAC=Media Access Control) which is responsible for Hybrid Automatic Repeat Request (HARQ) and for MAC demultiplexing, on the RLC layer (RLC=Radio Link Control) which is e.g. responsible for reassembly and Automatic Repeat Request (ARQ), and on the PDCP layer (PDCP=Packet Data Convergence Protocol) which is e.g. responsible for deciphering and header compression.

The processing on the modem unit board MU4 results in IP data which are sent to the control unit board CU2, which performs tasks on layer 3, i.e. on the radio resource control (RRC) layer, such as measurements and cell reselection, handover and RRC security and integrity.

The IP data are transmitted from the control unit board CU2 to respective interfaces INT for output and interaction with a user.

In the uplink, data transmission is performed in an analogue way in the reverse direction from the user terminal UE to the external IP network IPN.

The base station BS can be operable to communicate with one or more active user terminals UE and a base station can be located in or adjacent to a coverage area of another base station, e.g. a macro cell base station or small cell base station. Hence, embodiments may provide a mobile communication system comprising one or more user terminals and one or more base stations, wherein the base stations may establish macro cells or small cells, as e.g. pico-, metro-, or femto cells. A user terminal may correspond to a smartphone, a cell phone, user equipment, a laptop, a notebook, a personal computer, a Personal Digital Assistant (PDA), a Universal Serial Bus (USB)—stick, a car, a sensor for sensor networks, which might transmit and receive data with or without the interaction of a human being and other fixed installed or mobile communication devices able to transmit and receive data, etc. A user terminal may also be referred to as User Equipment or mobile in line with the 3GPP terminology.

A base station can be located in the fixed or stationary part of the network or system. A base station may correspond to a transmission point, an access point, a macro cell, a small cell, a micro cell, a femto cell, a metro cell etc. A base station may comprise the functionality of a remote radio head as depicted in FIG. 2 and described above. A base station can be a wireless interface of a wired network, which enables transmission of radio signals to a user terminal. Such a radio signal may comply with radio signals as, for example, standardized by 3GPP or, generally, in line with one or more of the above listed systems. Thus, a base station may correspond to a NodeB, an eNodeB, a Base Transceiver Station (BTS), an access point, a remote radio head, a transmission point etc., which may be further subdivided in a remote unit and a central unit.

A user terminal can be associated, camped on, or registered with a base station or cell. The term cell refers to a coverage area of radio services provided by a base station, e.g. a NodeB (NB), an eNodeB (eNB), a remote radio head, a transmission point, etc. A base station may operate one or more cells on one or more frequency layers, in some embodiments a cell may correspond to a sector. For example, sectors can be achieved using sector antennas, which provide a characteristic for covering an angular section around a remote unit or base station. In some embodiments, a base station may, for example, operate three or six cells covering sectors of 120° (in case of three cells), 60° (in case of six cells) respectively. A base station may operate multiple sectorized antennas. In the following a cell may represent an according base station generating the cell or, likewise, a base station may represent a cell the base station generates.

In other words, in embodiments the mobile communication system may correspond to a HetNet, which utilizes different cell types, i.e. Closed Subscriber Group (CSG) cells and open cells, and cells of different sizes, as, for example, macro cells and small cells, where the coverage area of a small cell is smaller than the coverage area of a macro cell. A small cell may correspond to a metro cell, a micro cell, a pico cell, a femto cell, etc. Such cells are established by base station for which their coverage areas are determined by their transmission power and interference condition. In some embodiments a small cell's coverage area can at least partly be surrounded by the coverage area of a macro cell established by another base station. The small cells can be deployed to extend the capacity of the network. A metro cell may therefore be used to cover a smaller area than a macro cell, e.g. a metro cell may cover a street or a section in a metropolitan area. For a macro cell the coverage area may have a diameter in the order of one or more kilometers, for a micro cell the coverage area may have a diameter below a kilometer, and for a pico cell the coverage area may have a diameter below 100 m. A femto cell may be the smallest cell and it may be used to cover a household or gate section at the airport, i.e. its coverage area may have a diameter below 50 m. Thus, a base station may also be referred to as cell.

Figure 3:
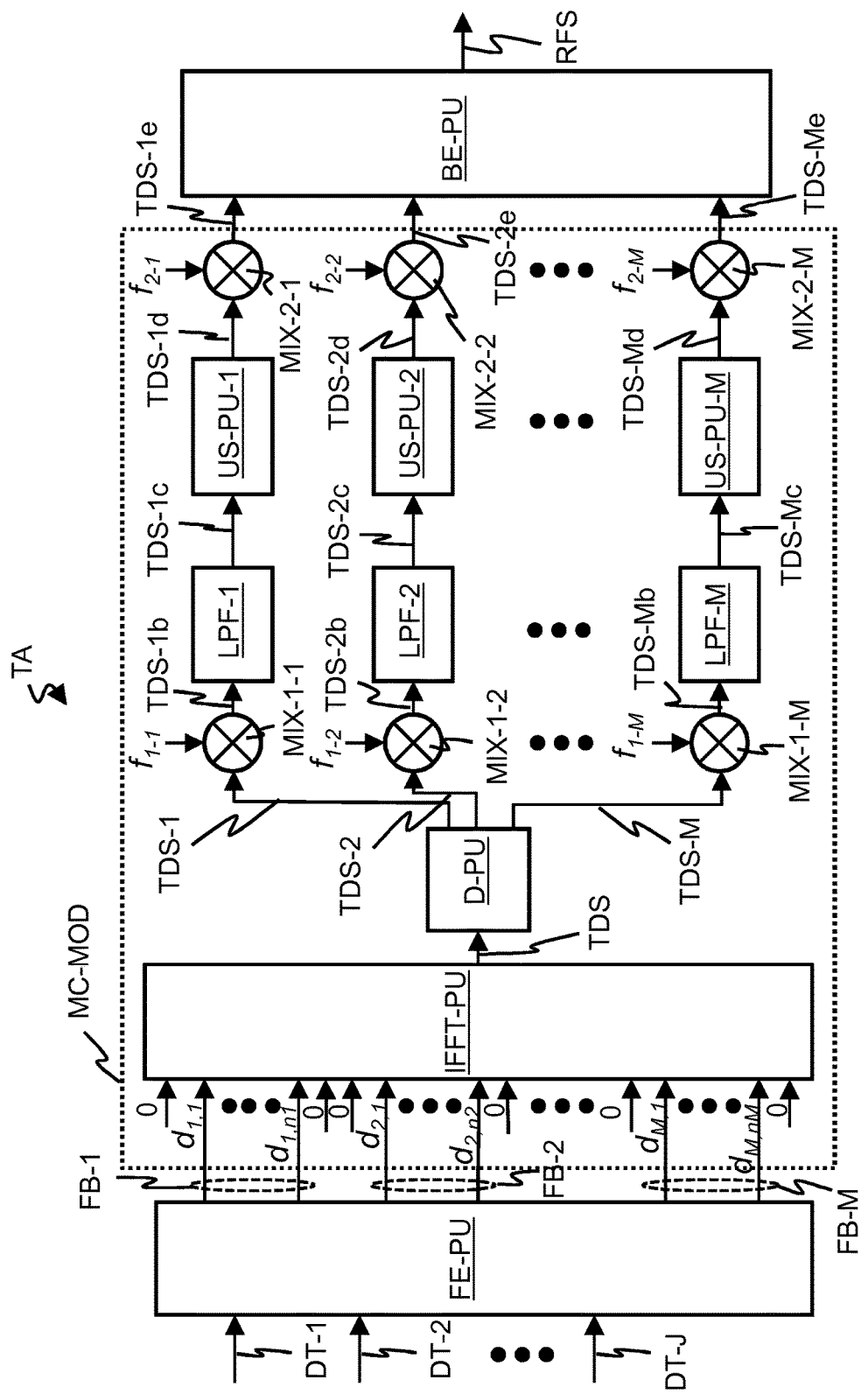
FIG. 3 schematically shows the processing in a transmitter apparatus for conditioning a multicarrier transmit signal according to an embodiment of the invention.
Figure 4:
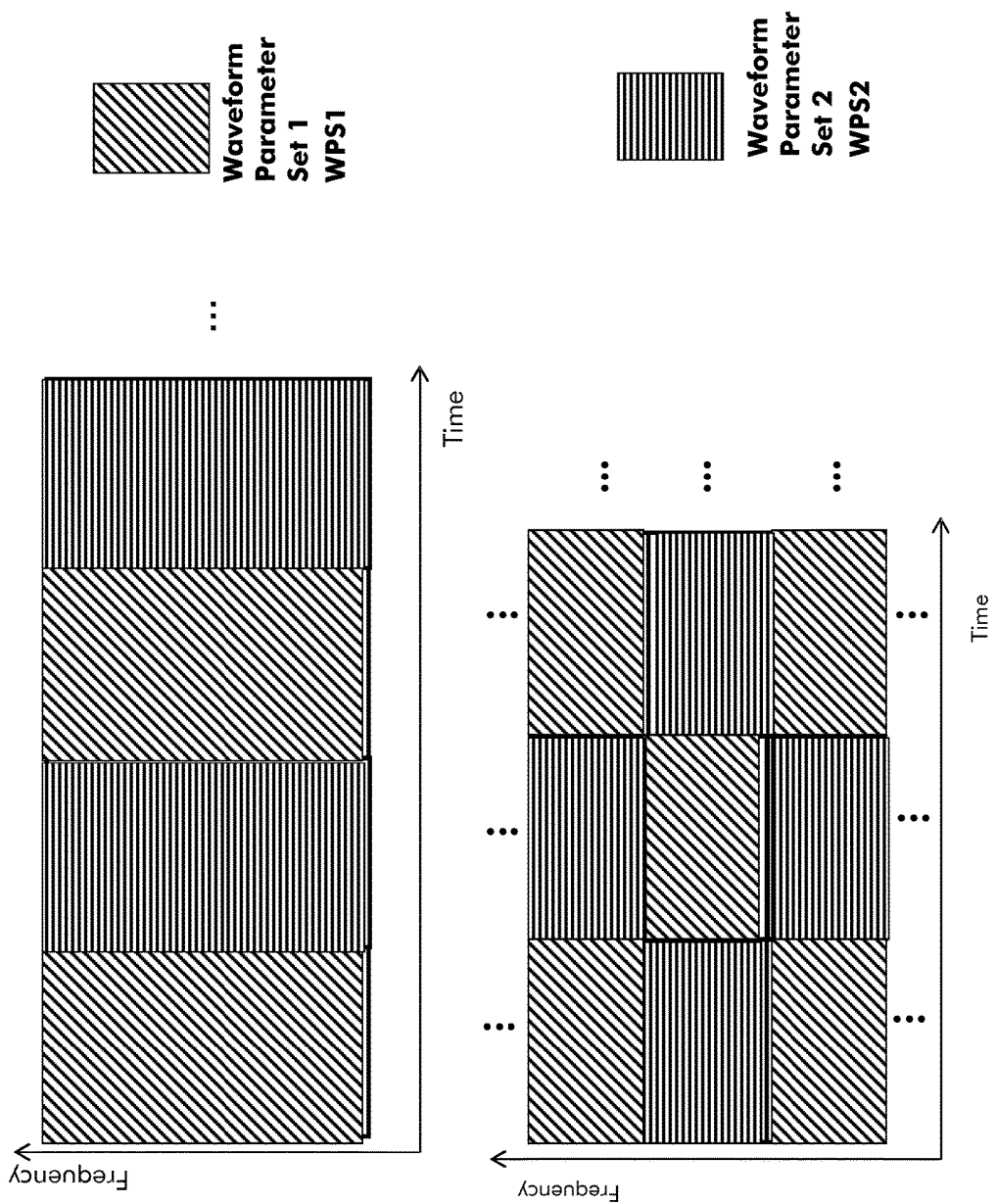
FIG. 4 schematically shows time-frequency alternating waveform parameter sets according to an embodiment of the invention.
Figure 5:
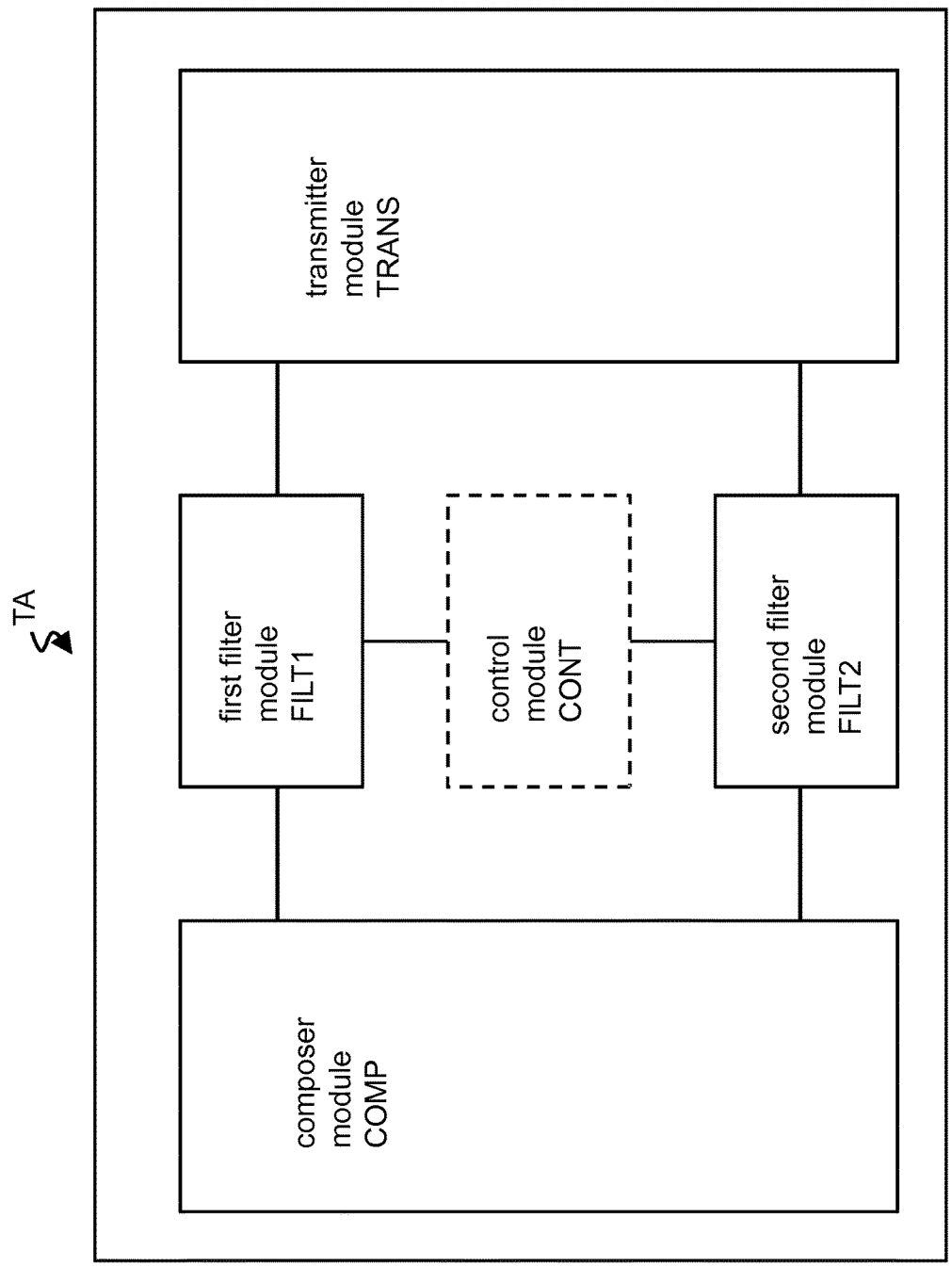
FIG. 5 schematically shows a block diagram of a transmitter apparatus for conditioning a multicarrier transmit signal according to an embodiment of the invention.

In the sequel, first in FIG. 3 and the respective description, a processing in a transmitter apparatus for conditioning a multicarrier transmit signal is shown, and then in FIG. 4, time-frequency alternating waveform parameter sets used for said multicarrier transmit signal according to embodiments of the invention are shown. In FIG. 5, a block diagram of the transmitter apparatus for conditioning a multicarrier transmit signal according to an embodiment of the invention is shown.

FIG. 3 shows schematically an example of a processing in a transmitter apparatus TA for conditioning a multicarrier signal according to an embodiment. Said transmitter apparatus TA may e.g. be implemented in user terminals U11-U31 as depicted in FIG. 1, or in the user terminal UE as depicted in FIG. 2. A splitting of processing functions across processing units shown in FIG. 3 is not critical, and as can be understood by those skilled in the art that the number of processing units, the number of processing functions and an allocation of the processing functions to the processing units may vary without departing from the scope of the embodiments of the invention as defined in the appended claims.

The transmitter apparatus TA contains an input for one data symbol layer or several data symbol layers DT-1, DT-2, . . . , DT-J, a so-called front end processing unit FE-FU for a preprocessing of the data symbol layers DT-1, DT-2, . . . , DT-J, a modulator MC-MOD, indicated in FIG. 3 by a dotted line, for modulation and further processing of frequency blocks FB-1, FB 2, . . . , FB-M, a so-called back end processing unit BE-PU for a post-processing of time domain signals TDS-1e. TDS-2e, TDS-Me and an output for radio frequency signals RFS, which contain the data symbol layers DT-1, DT-2, DT-J. Following description is only given for the case of applying several data symbol layers DT-1, DT-2, . . . , DT-J. A skilled person may easily adapt the transmitter apparatus TA1 for handling a single data symbol layer.

The different data symbols layers DT-1, DT-2, . . . , DT-J may correspond for example to encoded bit sequences, which are mapped to a constellation alphabet, like QPSK, 16-QAM etc. The data symbol layers DT-1, DT-2, . . . , DT-J may provide, besides the dimensions time and frequency, a further multiple access dimension, which in a CDMA sense can be interpreted as code, due to spreading, or in an IDMA sense (IDMA=interleave division multiple access) as channel coded layer. Alternatively, the data symbol layers DT-1, DT-2, . . . , DT-J may already be block-wise grouped in frequency, e.g. into L groups, to be arranged for a fragmented spectrum, leaving gaps for avoiding interference to other radio communication systems operating in a same frequency range.

In the front end processing unit FE-PU, a first data symbol layer DT-1 may be provided to a first processing unit for an encoding, interleaving, scrambling and symbol mapping according to one of the techniques known to persons skilled in the art for generating a first encoded, interleaved, scrambled and symbol mapped data symbol layer.

In a same way, in the front end processing unit FE-PU a further number J−1 of data symbol layers DT-2, . . . , DT-J may be processed by further first processing units for generating corresponding further encoded, interleaved, scrambled and symbol mapped data symbol layers. The data symbol layers may be represented for example by data symbol vectors $b_j$ with $j \in [1, 2, \ldots, J]$.

In the front end processing unit FE-PU, the first processing units may be applied for an efficient multi-user detection and/or multi-user separation. This means, that the interleaving and/or scrambling may be user-specific or layer-specific. By way of example a signal intended for one user could carry multiple signal layers, e.g. each having a different QoS requirement (QoS=quality of service).

In the front end processing unit FE-PU, the first encoded, interleaved, scrambled and symbol mapped data symbol layer may be provided to a second processing unit for a partitioning into L data blocks. The partitioning or segmentation into the L data blocks is intended to e.g. carry out the spreading. In a same way, the further encoded, interleaved, scrambled and symbol mapped data symbol layers are partitioned by further second processing units into corresponding L further data blocks.

According to an alternative embodiment, the number of data blocks of the different data symbol layers DT-1, DT-2, . . . , DT-J may vary. In such a case, the parameter L may be written with an index i with i=1, . . . , J. For simplification, the following description is given for the case of having a same number of data blocks for each data symbol layer DT-1, DT-2, . . . , DT-J. A skilled person may easily adapt the transmitter apparatus TA for handling a varying number of data blocks.

In the front end processing unit FE-PU, each one of the data blocks is provided to one of third processing units for a multicarrier spreading according to one of the techniques known to persons skilled in the art and for a pre-coding such as so-called DFT-preceding (DFT=Discrete Fourier Transformation) for reducing PAPR (PAPR=Peak Average Power Ratio), which is known from 3GPP LTE uplink processing. Thereby, the third processing units output a corresponding spread data block. The DFT-precoding allows spreading the data symbol vectors $b_j$ by a so-called DFT matrix for getting spread data symbol vectors $c_{j,l}$ with $j \in [1, 2, \ldots, J]$ and $l \in [1, 2, \ldots, L]$, which may have a same length as the data symbol vectors $b_j$. Thereby, a PAPR (PAPR=Peak-to-Average Power Ratio) of a time domain signal or of time domain signals can be reduced. In a same way, each of the further data streams or data blocks is spread and pre-coded by further third processing units for obtaining corresponding spread data streams or data blocks.

The second processing units and the third processing units in the front end processing unit FE-PU perform a mapping of the data symbol layers DT-1, DT-2, ..., DT-J to different layers such as CDMA codes or IDMA layers (IDMA=Interleave Division Multiple Access), which are described for example in Li Ping et al. "A Simple Approach to Near-Optimal Multiuser Detection: Interleave-Division MULTIPLE-Access", IEEE WCNC 2003, March 2003, page 391-396.

By a fourth processing unit in the front end processing unit FE-PU, the spread data blocks are grouped into two or more frequency blocks FB-1, FB-2, ..., FB-M. The grouping may be done by superimposing the spread data blocks of all layers and by a portioning of the superimposed and spread data streams or data blocks into the two or more frequency blocks FB-1, FB-2, ..., FB-M. Alternatively, the grouping may be done by combining several of the superimposed and spread data blocks. Here, the term superposition may denote an addition of signals, while the term combining may mean appending or stacking symbol vectors.

Each of the frequency blocks FB-1, FB-2, ..., FB-M may be represented by a data symbol vector $d_i=[d_{i,1}, d_{i,2}, \ldots, d_{i,n_i}]$ with $i \in [1, 2, \ldots, M]$ and with $n_i$ being a number of subcarriers of a corresponding frequency block FB-1, FB-2, FB-M. Each of the data symbol vectors $d_i$ may represent for example a single QAM symbol. The subcarriers e.g. comprise complex-valued sinusoids.

The processing functions of the modulator MC-MOD may be split into a first processing unit IFFT-PU, a second processing unit D-PU, a first group of mixers MIX-1-1, MIX-1-2, ..., MIX-1-M, a group of low pass filters LPF-1, LPF-2, ..., LPF-M, a group of up-sampling processing units US-PU-1, US-PU-2, ..., US-PU-M and a second group of mixers MIX-2-1, MIX-2-2, ..., MIX-2-M.

The first processing unit IFFT-PU may obtain as input parameters modified versions $d_i'=[0, \ldots, 0, d_{i,1}, d_{i,2}, \ldots, d_{i,n_i}, 0, \ldots, 0]$ of the data symbol vectors $d_i$ by appending one zero or several zero as symbols at the beginning and at the end of the original data symbol vectors $d_i$. A number of the zero symbols at the beginning and a number of the zero symbols at the end of the data symbol vectors $d_i'$ depends on requirements, which a radio frequency signal RFS being transmitted by the transmitter apparatus TA should fulfil, such as any frequency-dependent transmission power requirements defined e.g. in a so-called spectral mask. This ensures that the transmission power per considered subband stays below a certain value, measured e.g. in dBm.

The first processing unit IFFT-PU executes an IFFT (IFFT=Inverse Fast Fourier Transformation) and generates based on the data symbol vectors $d_i'$ the time domain signal TDS, which inherently includes the frequency blocks FB-1, FB-M at different frequency positions around the zero frequency.

The time domain signal IDS may be provided to the second processing unit D-PU for generating duplicates TDS-1, TDS-2, ..., TDS-M of the time domain signal TDS.

The first group of mixers MIX-1-1, MIX-1-2, ..., MIX-1-M is used to perform a frequency shift by an up-conversion or a down-conversion for the time domain signals TDS-1, TDS-2, ..., TDS-M so that for each one of the time domain signals TDS-1, TDS-2, ..., TDS-M one of the frequency blocks FB-1, ..., FB-M may be located around the zero frequency.

The time domain signal TDS-1 may be up-converted or downconverted by a first frequency $f_{1-1}$ using a first mixer MIX-1-1 for generating a first up-converted or down-converted time domain signal TDS-1b. In a similar way, the further time domain signals TDS-2, TDS-M may be up-converted or down-converted by corresponding further first frequencies $f_{1-2}, \ldots, f_{1-M}$ using corresponding further first mixers MIX-1-2, ..., MIX-1-M for generating corresponding further first up-converted or downconverted time domain signals TDS-2b, ..., TDS-Mb.

The first up-converted or down-converted time domain signal TDS-1b is provided to a low pass filter LPF-1, which generates a filtered time domain signal TDS-1c. In a similar way, the further first up-converted or down-converted time domain signals TDS-2b, ..., TDS-Mb are provided to corresponding further low pass filters LPF-2, ..., LPF-M for generating corresponding further filtered time domain signals TDS-2c, ..., TDS-Mc.

The filtered time domain signal TDS-1c is provided to an upsampling processing unit US-PU-1 for an interpolation and adaptation of a sampling rate of the filtered time domain signal TDS-1c and for generating an up-sampled time domain signal TDS-1d. The sampling rate may be adapted in such a way, that the sampling rate is high enough that the respective bandwidth covers all subsequent frequency shifts. Similarly, the further filtered time domain signals TDS-2c, ..., TDS-Mc are provided to corresponding further up-sampling processing units US-PU-2, ..., US-PU-M for generating corresponding further up-sampled time domain signals TDS-2d, ..., TDS-Md.

The up-sampled time domain signal TDS-1d is up-converted by a second frequency $f_{2-1}$ using a second mixer MIX-2-1 for generating a second up-converted time domain signal TDS-1e, which is shifted from the zero frequency to the intermediate frequency $f_{2-1}$. In a similar way, the further up-sampled time domain signals TDS-2d, ..., TDS-Md are up-converted by corresponding further second frequencies $f_{2-2}, \ldots, f_{2-M}$ using corresponding further second mixers MIX-2-2, ..., MIX-2-M for generating corresponding further second up-converted time domain signals TDS-2e, ..., TDS-Me.

The back end processing unit BE-PU contains a combiner, a digital-to-analogue converter unit, a mixer, a power amplifier and a filter unit such as a duplexer. The second up-converted time domain signals TDS-1e, TDS-2e, ..., TDS-Me are superimposed or added by the combiner for generating a total time domain signal. The total time domain signal being a digital signal is converted by the digital-to-analogue converter unit to an analogue time domain signal. The analogue time domain signal, which contains the various frequency blocks FB-1, ..., FB-M at the various frequency positions $f_{2-1}, f_{2-2}, \ldots, f_{2-M}$, is upconverted by a third frequency $f_3$ using the mixer for generating a radio frequency signal, which is shifted to a final central frequency position for example in a GHz range. The radio frequency signal is amplified by the power amplifier for generating an amplified radio frequency signal. The amplified radio frequency signal is filtered by the filter unit for generating the radio frequency signal RFS, which is applied to an antenna system being connected to the transmitter apparatus TA.

As already mentioned above, a basic idea according to embodiments of the invention is to introduce a heterogeneous time-frequency waveform pattern with alternating parameters known at both ends of the wireless link in order to allow for a relaxed synchronicity in terms of time and frequency between uplink users.

Thus, according to embodiments of the invention, the low pass filters LPF-1, ..., LPF-M as depicted in FIG. 3 have different filter characteristics, leading to different waveform patterns having different levels of spectral sidelobe suppression, thus causing a different amount of inter symbol interference (ISI) and inter carrier interference (ICI) to time or frequency neighbored resources. Wireless devices may then be assigned to resources with different waveform pattern depending on the quality of the wireless link.

In simple forms of the heterogeneous waveform pattern, two parameter settings are alternated time-slot wise or in the form of a "chessboard" pattern over time and frequency.

FIG. 4 schematically shows such simple forms of time-frequency alternating waveform parameter sets according to an embodiment of the invention.

In the upper part of FIG. 4, two waveform parameter sets are alternated time-slot wise, and in the lower part of FIG. 4, two waveform parameter sets are alternated in the form of a chessboard pattern over time and frequency. The first waveform parameter set WPS1 has a level of spectral sidelobbe suppression which is lower than the level of spectral sidelobbe suppression of the second waveform parameter set WPS2. The first waveform parameter set WPS1 can e.g. be generated by a finite impulse response filter which has a lower number of filter coefficients in time domain being different from zero than a finite impulse response filter used for generation of the second waveform parameter set WPS2, with both finite impulse response filters having the same total number of filter coefficients. Thus, the finite impulse response filter used for generation of the first waveform parameter set WPS1 causes less inter symbol interference (ISI) to time neighbored resources in case of time-asynchronity than the finite impulse response filter used for generation of the second waveform parameter set WPS2.

Figure 7:
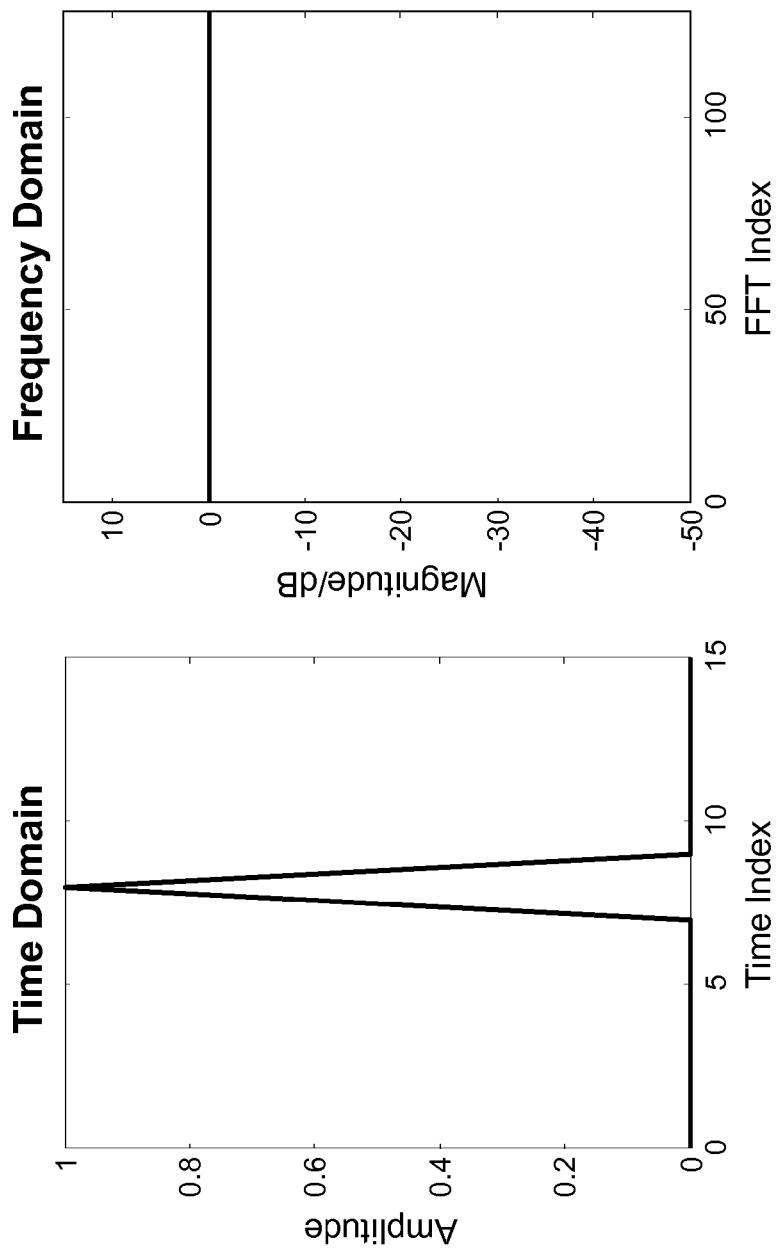
FIG. 7 schematically shows a filter function of an optimized Dirac-like FIR filter used for a first time-frequency waveform parameter set according to an embodiment of the invention.

In an embodiment, a so-called dirac-like filter with pre- and appended zeros and only one filter coefficient being different from zero is used for generation of the first waveform parameter set WPS1 as shown in FIG. 7 and described below. This filter shape at the same time brings vulnerability against intercarrier interference due to spectral side-lobe levels being comparatively high.

Figure 6:
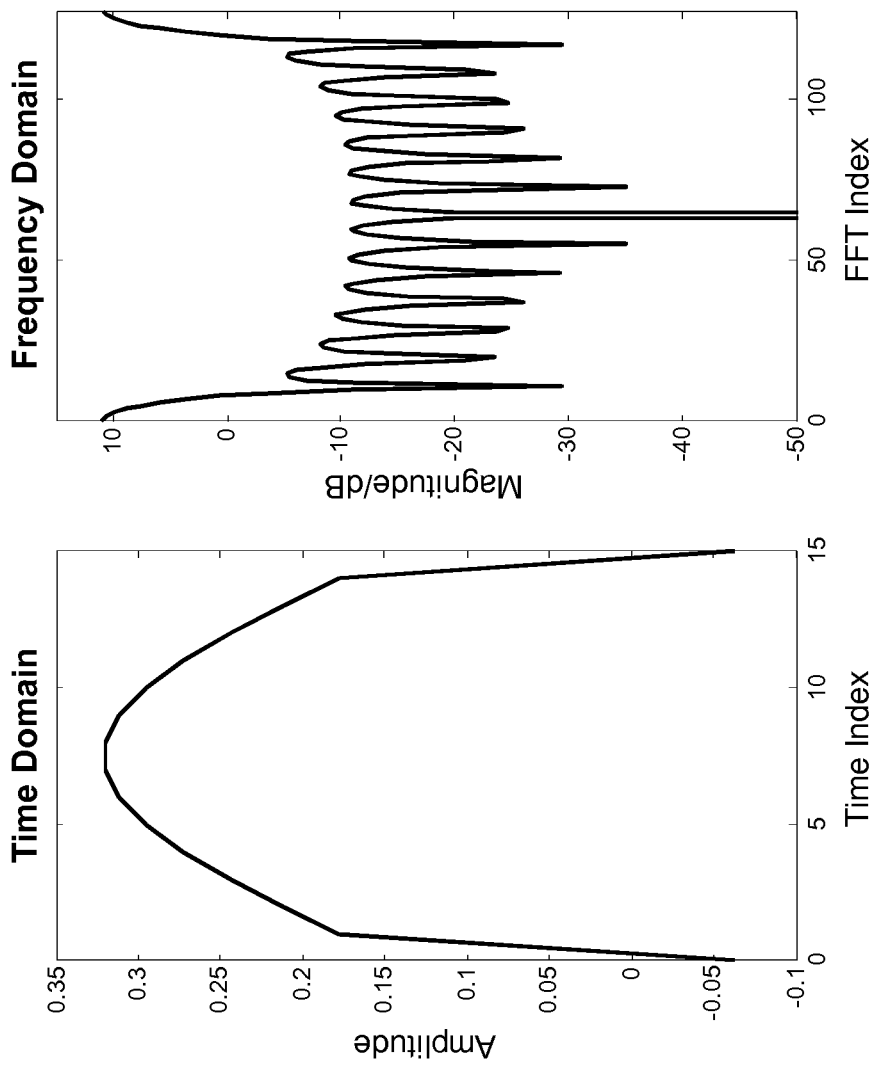
FIG. 6 schematically shows a filter function of an optimized FIR filter used for a second time-frequency waveform parameter set according to an embodiment of the invention.

In an embodiment, a filter which is optimized in terms of signal-to-interference ratio (SIR) against ISI and inter carrier interference (ICI) for time-frequency misalignments is used for generation of the second waveform parameter set WPS2 as shown in FIG. 6 and described below. As an alternative, a filter which is optimized in terms of signal-to-leakage-ratio (SLR) against ISI and inter carrier interference (ICI) for time-frequency misalignments may be used for generation of the second waveform parameter set WPS2 as shown in FIG. 6.

In FIG. 4, the units given in time may be multi-carrier symbols or multiple multi-carrier symbols (slots/subframes/frames).

As the first waveform parameter set WPS1 causes less interference to the second waveform parameter set WPS2 in general, the signal-to-interference ratio (SIR) for the resources where the second waveform parameter set WPS2 is used will be improved. At the same time, as a consequence, resources with the first waveform parameter set WPS1 have lower SIR. This is obvious for the two waveform parameter sets which are alternated time-slot wise in the upper part of FIG. 4, but also holds for the two waveform parameter sets which are alternated in the form of a chessboard pattern over time and frequency in the lower part of FIG. 4 due to particular symmetries between ISI and ICI contributions, as will be explained below under FIG. 11.

This special effect will be exploited for contention-based access in the following way:

Wireless devices first obtain some information on their link quality, e.g. based on downlink (DL) pilots, path loss measurements, channel quality information (CQI) feedback etc. Then the wireless devices classify themselves into two types of devices, e.g. based on thresholds. Cell-edge users with poor signal-to-noise-plus-inter-cell-interference voluntarily access the system on multiple access resources with the first waveform parameter set WPS1. Cell-inner devices with higher signal-to-noise-plus-inter-cell-interference will use the resources with the second waveform parameter set WPS2.

As a consequence, the cell-inner devices will experience in total a higher SINR including the intra-cell interference due to relaxed synchronicity causing ICI and ISI. The cell-outer devices will have negligible losses in SINR, as the noise plus inter-cell interference dominates over intra-cell interference in their operation point. In total the system throughput will be increased without requiring additional control signaling overhead.

In scheduled access, the same mechanisms can be applied by the resource allocation controlled by a base station, controlled by grants via downlink signaling. As the base station has link quality information available, e.g. CQI feedback, it can allocate low SINR users to resources of the first waveform parameter set WPS1 and high SINR users to resources with the second waveform parameter set WPS2.

FIG. 5 schematically shows a block diagram of a transmitter apparatus TA for conditioning a multicarrier transmit signal according to an embodiment of the invention.

The transmitter apparatus TA may be adapted to or operable in user terminals U11-U31 as depicted in FIG. 1, or in the user terminal UE as depicted in FIG. 2. The transmitter apparatus TA comprises a composer module COMP, which is operable to compose a multicarrier transmit signal comprising a plurality of subcarriers. That is to say that the multicarrier signal comprises orthogonal or non-orthogonal subcarriers, each having a certain sub-bandwidth. The composer module COMP may correspond to one or more composer units, one or more composer devices, or any means for composing. In some embodiments the composer module COMP may be implemented in software, which is executable on accordingly adapted hardware, such as a processor, a Digital Signal Processor (DSP), a multi-purpose processor, or the like. The composer module COMP may determine or receive user data and then compose a transmit signal for subsequent filtering and transmission. For example, the composer module COMP may comprise means for converting a frequency domain signal to the time domain, such as a Fast Fourier Transformation (FFT) module. In principle, the composer module COMP comprises the functions of the front end processing unit FE-PU, the first processing unit IFFT-PU, the second processing unit D-PU, and the first group of mixers MIX-1-1 and MIX-1-2 as depicted in FIG. 3 and described above.

The transmitter apparatus TA further comprises a first filter module FILT1, which is coupled to the composer module COMP. The first filter module FILT1 is operable to filter a first subgroup of subcarriers using a first filter characteristic, generating e.g. the first waveform parameter set WPS1 as depicted in FIG. 4 and described above, to obtain a first transmit component. In principle, the first filter module FILT1 corresponds to the low pass filter LPF-1 as depicted in FIG. 3 and described above.

The transmitter apparatus TA further comprises a second filter module FILT2, which is coupled to the composer module COMP. The second filter module COMP is operable to filter a second subgroup of subcarriers using a second filter characteristic, which is different from the first filter characteristic, generating e.g. the second waveform parameter set WPS2 as depicted in FIG. 4 and described above, to obtain a second transmit component. In principle, the second filter module FILT2 corresponds to the low pass filter LPF-2 as depicted in FIG. 3 and described above.

The first and second filter modules FILT1 and FILT2 may correspond to one or more filter devices, one or more filter units, or any means for filtering. For example, they may correspond to Finite Impulse Response (FIR) filters and they may be implemented digitally, e.g. by means of software being executed on accordingly adapted hardware, such as a DSP.

The transmitter apparatus TA further comprises a transmitter module TRANS, which is operable to transmit the first and the second transmit components. In principle, the transmitter module TRANS comprises up-sampling processing units US-PU-1 and US-PU-2, the second group of mixers MIX-1-1 and MIX-1-2, and the back end processing unit BE-PU as depicted in FIG. 3 and described above.

The transmitter module TRANS may correspond to one or more transmitter devices, one or more transmitter units, or any means for transmitting. The transmitter module TRANS may therefore comprise typical transmitter components, such as one or more antennas, filter or filter circuitry, an amplifier such as a Power Amplifier (PA), conversion circuitry for converting a base band signal to a Radio Frequency (RF) signal, a digital/analogue converter, or signal processing capability such as a Digital Signal Processor (DSP).

In some embodiments the transmitter apparatus TA may further comprise a control module CONT, which is operable to control the first and the second filter characteristics of the first and second filter modules FILT1 and FILT2. The control module CONT may correspond to one or more control units, one or more control devices, or any means for controlling. In some embodiments the control module CONT may be implemented in software, which is executable on accordingly adapted hardware, such as a processor, a Digital Signal Processor (DSP), a multi-purpose processor, or the like.

The control module CONT may be coupled to the first and second filter modules FILT1 and FILT2 and is illustrated in FIG. 5 as optional component (dashed lines) of the transmitter apparatus TA.

The control module CONT may be operable to obtain information related to transmission channel properties of the transmission channel between the transmitter apparatus TA and a first receiver and between the transmitter apparatus TA and a second receiver. Such information may correspond to any information on, for example, a delay spread, a Doppler shift, an attenuation, an interference or noise condition, a channel quality, a reception power, etc. The control module CONT may be further operable to control the first and the second filter characteristics of the first and second filter modules FILT1 and FILT2 based on the information related to the transmission channels. For example, the control module CONT may be operable to select for the first filter module FILT1 the filter characteristic of a so-called dirac-like filter with pre- and appended zeros and only one filter coefficient being different from zero for generation of the first waveform parameter set WPS1 as shown in FIG. 7 and described below. Furthermore, the control module CONT may be operable to select for the second filter module FILT2 the filter characteristic of a filter which is optimized in terms of signal-to-interference ratio (SIR) against ISI and inter carrier interference (ICI), or in terms of signal-to-leakage ratio (SLR) against ISI and inter carrier interference (ICI), for time-frequency misalignments for generation of the second waveform parameter set WPS2 as shown in FIG. 6 and described below. In this case, wireless devices, as e.g. user terminals, experiencing a link quality which is lower than a threshold can use time-frequency resource elements which are filtered by the first filter module FILT1, and wireless devices, as e.g. user terminals, experiencing a link quality which is higher than a threshold can use time-frequency resource elements which are filtered by the second filter module FILT2.

In further embodiments the control module CONT may be operable to select the first and second filter characteristics from a predefined set of two or more filter characteristics.

In some embodiments, all users or transmitters may use the same filter lengths, e.g. identical number of samples at the filter input. That is to say that the first and second filter characteristics may be determined by a first plurality of filter coefficients and a second plurality of filter coefficients. The first plurality of filter coefficients may comprise the same number of coefficients as the second number of filter coefficients. The filter parameters or coefficients may vary in order to adapt a transmitter's filter characteristic to the channel condition.

In FIGS. 6 and 7 and the following description, embodiments for filter realizations to achieve the first and second waveform parameter sets WPS1 and WPS2 are disclosed.

FIG. 6 schematically shows a filter function of an optimized FIR filter used for the second time-frequency waveform parameter set WPS2 according to an embodiment of the invention.

In the left part of FIG. 6, the amplitude of the optimized FIR filter is depicted over the time index. In the embodiment, the optimized FIR filter has a length of 16.

In the right part of FIG. 6, the magnitude in dB of the optimized FIR filter is depicted over the FFT index.

For the case of a timing offset, the filter function of the optimized FIR filter is chosen so that the ratio of total in-band signal power and total ISI, ICI and out-of-band leakage power is optimized. This optimization approach results in a generalized eigenvalue problem, which has a closed-form solution.

FIG. 7 schematically shows a filter function of an optimized Dirac-like FIR filter used for the first time-frequency waveform parameter set WPS1 according to an embodiment of the invention.

In the left part of FIG. 7, the amplitude of the Dirac-like FIR filter is depicted over the time index. In the embodiment, the Dirac-like FIR filter has a length of 16.

In the right part of FIG. 7, the magnitude in dB of the Dirac-like FIR filter is depicted over the FFT index.

The Dirac-like FIR filter used for the first time-frequency waveform parameter set WPS1 is of the same length as the optimized FIR filter used for the second time-frequency waveform parameter set WPS2, but just contains a single unit amplitude pulse, while all other filter coefficients are zero, as illustrated in the left part of FIG. 7. As a consequence, a UFMC signal generated based on this filter results into a zero-pre/postfix-OFDM, thus a pure OFDM with zero-amplitude guard samples in time for ISI protection.

FIG. 7 reveals that this filter, while protecting well against short timing offsets due to the zero-valued guard samples will have no inherent protection against ICI effects which are also present when the timing offset exceeds the guard time, as there is no spectral side lobe level reduction, as in the optimized FIR filter from FIG. 6.

In the following, the performance results using the time-frequency alternating waveform parameter sets WPS1 and WPS2 as depicted in FIG. 4 and described above will be presented and compared to conventional filter structures. First, in FIG. 8, the mean squared error over timing offset is shown if the same filter, i.e. the same waveform parameter set, is used in every subband and every symbol. Then, in FIG. 8, the mean squared error over timing offset is shown if time-frequency alternating waveform parameter sets WPS1 and WPS2 are used as depicted in FIG. 4 and described above. Finally, in FIG. 10, a comparison of the mean squared error over timing offset for the same waveform parameter set as depicted in FIG. 8, and alternating waveform parameter sets WPS1 and WPS2 as depicted in FIG. 9 is shown.

In the simulation, the FFT size is chosen to be 128 and each subband is allocated with 12 consecutive subcarriers without any guard subcarriers between subbands. That allows a maximum subband number of 10. The FIR filter has a length of 16. In the scenario for the simulation, it is considered, that one subband for the User of Interest (UoI) is synchronized perfectly at the receive side, which means without any timing offset. All the other 9 subbands signals are corrupted by timing offset, which causes distortions to the UoI due to loss of orthogonality and ISI.

Figure 8:
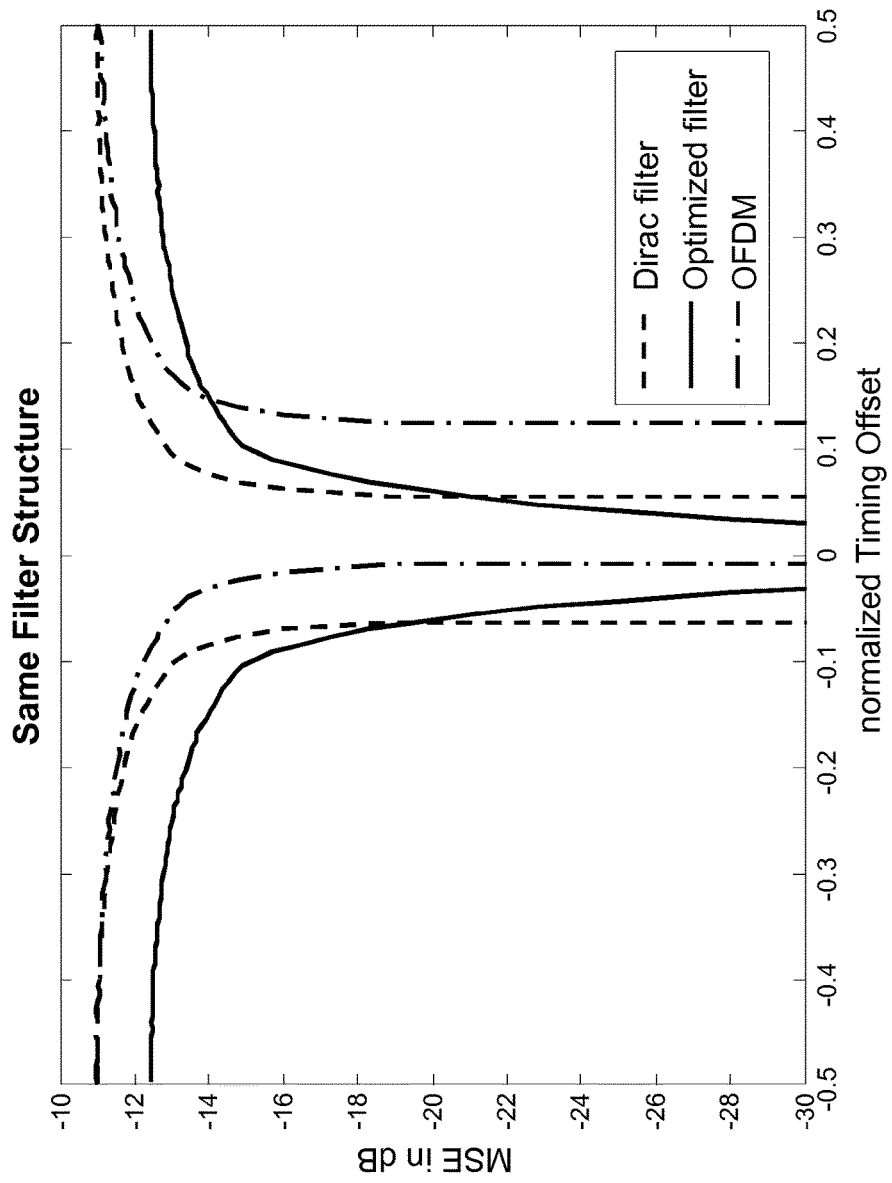
FIG. 8 schematically shows the mean squared error over timing offset for interference caused by adjacent subband users for single waveform parameter sets.
Figure 9:
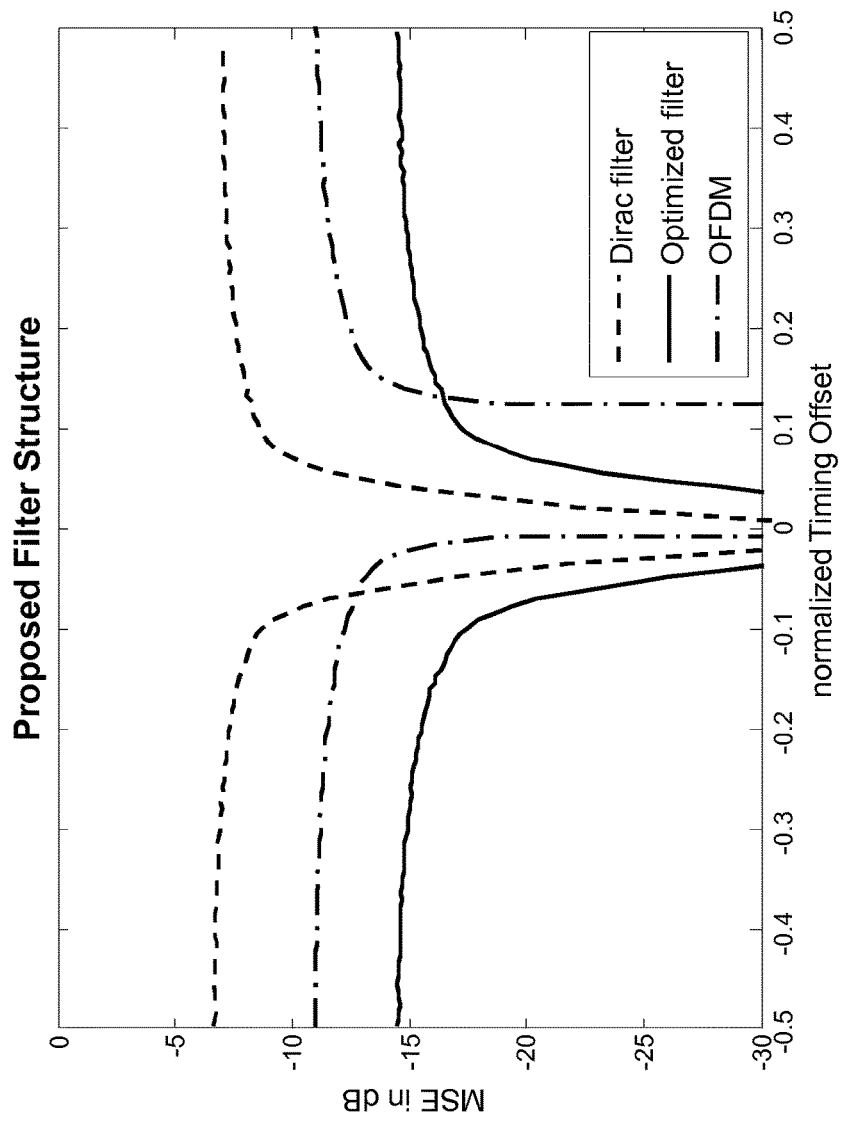
FIG. 9 schematically shows the mean squared error over timing offset for interference caused by adjacent subband users for alternating waveform parameter sets according to an embodiment of the invention.

FIG. 8 schematically shows the mean squared error over timing offset in fractions of multi-carrier symbols for interference caused by adjacent subband users for single waveform parameter sets, i.e. if the same filter is used in every subband and every symbol.

The mean squared error for OFDM is depicted by dashed-and-dotted curves, the mean squared error for the Dirac-like filter as depicted in FIG. 7 is depicted by dashed curves, and the mean squared error for the optimized FIR filter as depicted in FIG. 6 is depicted by solid curves.

FIG. 9 schematically shows the mean squared error over timing offset for interference caused by adjacent subband users for alternating waveform parameter sets according to an embodiment of the invention.

The simulation is performed for the two waveform parameter sets WPS1 and WPS2 according to FIG. 4, with both patterns depicted in FIG. 4 resulting in the same performance.

The mean squared error for OFDM is depicted by dashed-and-dotted curves, the mean squared error for the User of Interest (UoI) using the Dirac-like filter according to FIG. 7, and for the interfering users using the optimized FIR filter according to FIG. 6 is depicted by dashed curves, and the mean squared error for the User of Interest (UoI) using the optimized FIR filter according to FIG. 6, and for the interfering users using the Dirac-like filter according to FIG. 7 is depicted by solid curves.

Figure 10:
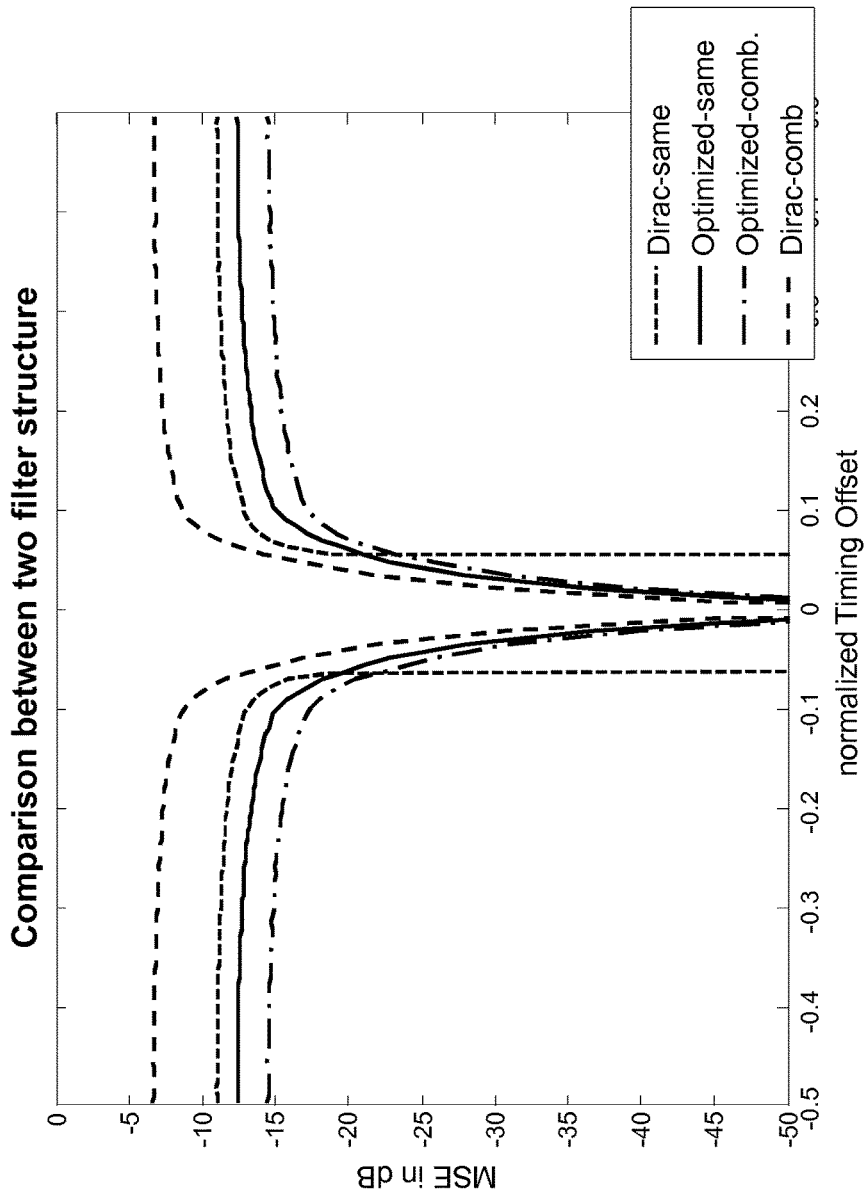
FIG. 10 schematically shows a comparison of the mean squared error over timing offset for interference caused by adjacent subband users for single waveform parameter sets and for alternating waveform parameter sets according to an embodiment of the invention.

FIG. 10 schematically shows a comparison of the mean squared error over timing offset for interference caused by adjacent subband users for single waveform parameter sets and for alternating waveform parameter sets according to an embodiment of the invention.

The mean squared error for the Dirac-like filter as depicted in FIG. 7 as the single waveform parameter set is depicted by small-dashed curves, and the mean squared error for the optimized FIR filter as depicted in FIG. 6 as the single waveform parameter set is depicted by solid curves.

The mean squared error for the User of Interest (UoI) using the Dirac-like filter according to FIG. 7, and for the interfering users using the optimized FIR filter according to FIG. 6 is depicted by large-dashed curves, and the mean squared error for the User of Interest (UoI) using the optimized FIR filter according to FIG. 6, and for the interfering users using the Dirac-like filter according to FIG. 7 is depicted by dashed-and-dotted curves One can see that the optimized FIR filter according to FIG. 6 has better performance with the alternating waveform parameter sets, while resources with the Dirac-like filter according to FIG. 7 have reduced performance with the alternating waveform parameter sets.

For a better overview, the mean squared error (MSE) in dB of the User of Interest (UoI) is averaged over certain timing offset ranges, which comprise positive and negative offsets, and which are normalized to the multi-carrier symbol duration, and is listed in table 1 for a single waveform parameter set using the Dirac-like filter according to FIG. 7, or the optimized FIR filter according to FIG. 6, and is listed in table 2 for two alternating waveform parameter sets WPS1 and WPS2 as depicted in FIG. 4 for the User of Interest (UoI) using the optimized FIR filter according to FIG. 6, and for the User of Interest (UoI) using the Dirac-like filter according to FIG. 7 of the proposed filter structure of this invention.

TABLE 1

Averaged MSE in dB for certain timing offset ranges for a single waveform parameter set:

| | timing offset | | | | | |
|---|---|---|---|---|---|---|
| | 0.05 | 0.1 | 0.2 | 0.3 | 0.4 | 0.5 |
| OFDM | −18 | −16.57 | −14.39 | −13.31 | −12.69 | −12.31 |
| Dirac-like-Filter | −311 | −17.99 | −14.23 | −13.05 | −12.50 | −12.16 |
| Optimized filter | −28.42 | −20.08 | −16.10 | −14.78 | −14.15 | −13.77 |

TABLE 2

Averaged MSE in dB for certain timing offset ranges for two alternating waveform parameter sets WPS1 and WPS2:

| | timing offset | | | | | |
|---|---|---|---|---|---|---|
| | 0.05 | 0.1 | 0.2 | 0.3 | 0.4 | 0.5 |
| Dirac-like-Filter | −22.35 | −13.43 | −9.81 | −8.68 | −8.15 | −7.83 |
| Optimized filter | −31.43 | −22.28 | −18.28 | −16.93 | −16.29 | −15.89 |

So the proposed filter structure with two alternating waveform parameter sets WPS1 and WPS2 improves the SIR for the User of Interest (UoI) using the optimized FIR filter about 3 dB in case of a timing offset range plus and minus 0.05 and 2.1 dB in case of a higher timing offset range, while the SIR for the User of Interest (UoI) with the Dirac-like filter suffers from more ISI.

In case of a scheduled access for wireless devices to the time-frequency resources with alternating waveform parameter sets WPS1 and WPS2 as e.g. depicted in FIG. 4, the base station scheduler can now allocate wireless devices experiencing a high SINR to the waveform parameter set WPS2 using an optimized FIR filter as e.g. depicted in FIG. 6, and wireless devices experiencing a low SINR stemming from intra/inter-cell interference and noise to the waveform parameter set WPS1 using a Dirac-like filter as e.g. depicted in FIG. 7.

In the low SINR regime, distortions from ISI and ICI due to asynchronous wireless devices, e.g. in adjacent subbands, remain small compared to the impact of inter-cell interference and noise and thus the performance loss is negligible as well.

In the high SINR regime, distortions from ISI and ICI due to asynchronous wireless devices, e.g. in adjacent subbands, are limiting throughput performance. Due to the embodiments of the invention, wireless devices with high SINR are allocated to the waveform parameter set WPS2 using an optimized FIR filter as e.g. depicted in FIG. 6, which provides performance gains according to FIG. 10 and table 1 and 2. E.g. 3 dB higher SINR can be achieved using the alternating waveform parameter sets WPS1 and WPS2 as e.g. depicted in FIG. 4.

In the embodiments described above and depicted e.g. in FIG. 5, the corresponding processing steps can be performed e.g. in the modem unit boards MU1-MU4 and the control unit board CU1, CU2 of the base station BS and the user terminal UE respectively as depicted in FIG. 2 and described above.

As already mentioned above, time-frequency resources with the first waveform parameter set WPS1 using a Dirac-like filter as e.g. depicted in FIG. 7 have a lower SIR. This is obvious for the two waveform parameter sets which are alternated time-slot wise in the upper part of FIG. 4, but also holds for the two waveform parameter sets which are alternated in the form of a chessboard pattern over time and frequency in the lower part of FIG. 4 due to particular symmetries between ISI and ICI contributions, as will be explained in the following with the use of FIG. 11.

Figure 11:
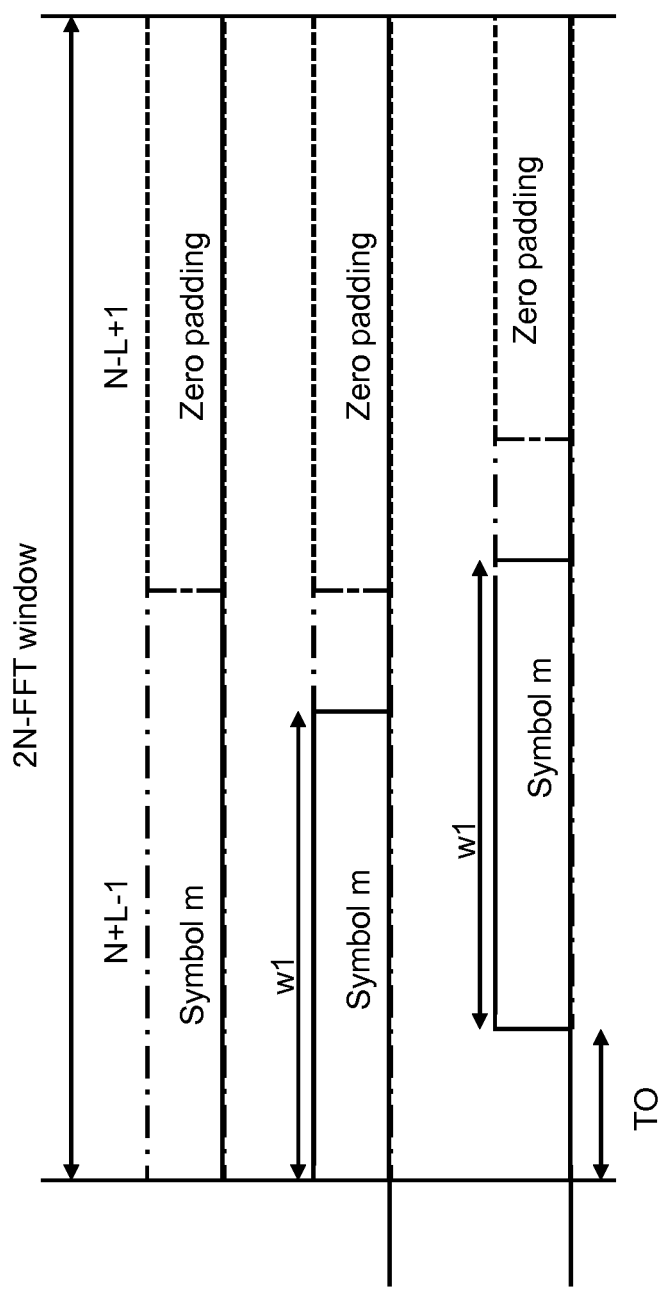
FIG. 11 schematically shows a fourier transformation window of a symbol with and without timing offset.

FIG. 11 schematically shows a fourier transformation window of a symbol with and without timing offset which will be used to proof the analogy of ISI and ICI in UFMC in case of a timing offset (TO).

In case of a timing offset, the received signal consists of a symbol m with the length of N+L−1−nto and the symbol m+1 with the length of nto.

This fact can be mathematically modeled as a multiplication with a rectangular window with ones in the corresponding position for symbol m and m+1, respectively. Consider the signal of a subband i as shown in FIG. 11, the perfect synchronized symbol m is first of all multiplied with a rectangular window w1. Then, the windowed signal is cyclic shifted to the correct position. With the property of the FFT operation, the resulting frequency domain signal of the m-th symbol part can be written as $$\hat{Y}_m(k) = e^{j\varphi_1(k)}(W_1 * (\tilde{X}_{i,m} F_i))(k)$$

Where $e^{j\varphi_1(k)}$ represents a linear phase shift due to the cyclic shift in time domain and $W_1$, $\tilde{X}_{i,m}$ and $F_j$ are the 2N-point FFT of the time domain signal respectively.

Similarly, we are also able to formulate the frequency domain signal of the m+1-th symbol part as:

$$\hat{Y}_{m+1}(k) = e^{j\varphi_2(k)}(W_2 * (\tilde{X}_{i,m+1} F_i))(k)$$

Also we notice the fact that the two windows w1 and w2 we used in the formulation are not independent of each other. The relation between these two windows can be easily described by w1+w2=w. This window w corresponds to the zero padding approach in the receiver, which is independent of the timing offset and determined only by the FIR-filter length L and overall number of subcarriers N. Hence, we are able to formulate the symbol estimates in case of timing offset as:

$$\hat{Y}(k) = e^{j\varphi_1(k)}(W * (\tilde{X}_{i,m} F_i))(k) - $$
$$e^{j\varphi_1(k)}(W_2 * (\tilde{X}_{i,m} F_i))(k) + e^{j\varphi_2(k)}(W_2 * (\tilde{X}_{i,m+1} F_i))(k)$$

The first term of the three terms in the equation is only a linear phase shifted signal for symbol m, since $$e^{j\varphi_1(k)}(W * (\tilde{X}_{i,m} F_i))(k) = e^{j\varphi_1(k)} \tilde{X}_{i,m}(k) F_i(k)$$

The second term appears because of the loss of orthogonality for symbol m, which causes ICI.

The last term results in ISI from the previous symbol m+1. Under the assumption that the symbol m and m+1 are filtered with the same filter and all the symbols within the subband are uncorrelated, we can calculate the ISI and ICI energy in every subcarrier. It is obvious from the equation above that the energy of ISI and ICI are theoretically the same under aforementioned assumptions, because the second and last terms differ only in phase shift and symbol index. For a subcarrier k, which does not belong to the considered subband i, the expected energy of ISI and ICI resulting from the timing offset of the subband i can be formulated as follows:

$$E\{\|I_{i,ICI}(k)\|^2\} = E\{\|I_{i,ISI}(k)\|^2\} = E\left\{\left\|\sum_{l=0}^{2N-1} W_2(l-k)\tilde{X}_{i,m}(l)F_i(l)\right\|^2\right\}$$
$$= E\left\{\left\|\sum_{l=0}^{2N-1} W_2(l-k)\tilde{X}_{i,m+1}(l)F_i(l)\right\|^2\right\}$$

So far we proved that the energy of ISI and ICI due to a timing offset of a subband for subcarriers outside of this subband are statistically the same. This statement can be easily extended to a scenario with multiple subbands with timing offset which are interfering the User of Interest (UoI), since the symbols of different subbands are also uncorrelated.

The invention claimed is:

1. A method for conditioning a multicarrier transmit signal using a transmitter apparatus which comprises a composer module, a first filter module, a second filter module, and a transmitter module (TRANS), the method comprising:

the composer module composing a multicarrier transmit signal using a first or a second set of subgroups of time-frequency resource elements, with at least one subgroup of the first set of subgroups and at least one subgroup of the second set of subgroups having common time or frequency resources and being neighboured in time or frequency, the first filter module filtering the first set of subgroups of time-frequency resource elements using a first filter characteristic defined by a first set of filter coefficients in case the multicarrier transmit signal is composed of the first set of subgroups of time-frequency resource elements, the second filter module filtering the second set of subgroups of time-frequency resource elements using a second filter characteristic defined by a second set of filter coefficients different from the first set of filter coefficients, in case the multicarrier transmit signal is composed of the second set of subgroups of time-frequency resource elements, and the transmitter module transmitting the multicarrier transmit signal, wherein if a wireless device comprising the transmitter apparatus for conditioning the multicarrier transmit signal experiences a link quality being lower than a threshold, then the transmitter apparatus uses the first set of subgroups of time-frequency resource elements, and if the wireless device comprising the transmitter apparatus for conditioning the multicarrier transmit signal experiences the link quality being higher than the threshold, then the transmitter apparatus uses the second set of subgroups of time-frequency resource elements.

2. The method according to claim 1, further comprising:

the first filter module filtering the first set of subgroups of time-frequency resource elements using a first filter characteristic having a first level of spectral sidelobe suppression in case the multicarrier transmit signal is composed of the first set of subgroups of time-frequency resource elements, the second filter module filtering the second set of subgroups of time-frequency resource elements using a second filter characteristic having a second level of spectral sidelobe suppression, said second level of spectral sidelobe suppression being higher than the first level of spectral sidelobe suppression, in case the multicarrier transmit signal is composed of the second set of subgroups of time-frequency resource elements.

3. The method according to claim 1, wherein subgroups of the first set of subgroups of time-frequency resource elements are alternated in time with subgroups of the second set of subgroups of time-frequency resource elements.

4. The method according to claim 1, wherein subgroups of the first set of subgroups of time-frequency resource elements are alternated in time and frequency with subgroups of the second set of subgroups of time-frequency resource elements.

5. The method according to claim 1, wherein said link quality is at least one of a group of a signal-to-noise-plus-inter-cell-interference, a channel quality indicator corresponding to a preferred modulation and coding scheme, an expected data throughput, a quality indicator based on log-likelihood ratios, a quality indicator based on the number of successful cyclic redundancy checks, a quality indicator based on error vector magnitudes, a quality indicator based on mean squared errors, and a quality indicator based on frame, block, symbol or bit error rates.

6. The method according to claim 1, wherein said link quality is based on at least one of a group of downlink pilot measurements, path loss measurements and channel quality information.

7. The method according to claim 1, wherein said wireless device comprising the transmitter apparatus for conditioning the multicarrier transmit signal determines whether it experiences the link quality being lower than said threshold or being higher than said threshold.

8. The method according to claim 1, further comprising determining whether the wireless device experiences the link quality being lower than said threshold or being higher than said threshold.

9. The method according to claim 1, wherein said second filter module provides an optimized ratio of total in-band signal power to total inter-symbol-interference, inter-carrier-interference and out-of-band leakage power.

10. The method according to claim 1, wherein said first filter module contains only one filter coefficient in time domain being different from zero.

11. A transmitter apparatus comprising:

at least one processor; and at least one memory including computer program code, the at least one memory and the computer program code configured to, with the at least one processor, cause the transmitter apparatus at least to perform:

composing a multicarrier transmit signal using a first or a second set of subgroups of time-frequency resource elements, with at least one subgroup of the first set of subgroups and at least one subgroup of the second set of subgroups having common time or frequency resources and being neighboured in time or frequency, filtering the first set of subgroups of time-frequency resource elements using a first filter characteristic defined by a first set of filter coefficients, filtering the second set of subgroups of time-frequency resource elements using a second filter characteristic defined by a second set of filter coefficients different from the first set of filter coefficients, and transmitting the multicarrier transmit signal, wherein if a wireless device comprising the transmitter apparatus experiences a link quality being lower than a threshold, then the transmitter apparatus uses the first set of subgroups of time-frequency resource elements, and if the wireless device comprising the transmitter apparatus experiences the link quality being higher than the threshold, then the transmitter apparatus uses the second set of subgroups of time-frequency resource elements.

12. A wireless device comprising:

at least one processor; and at least one memory including computer program code, the at least one memory and the computer program code configured to, with the at least one processor, cause the wireless device at least to perform:

composing a multicarrier transmit signal using a first or a second set of subgroups of time-frequency resource elements, with at least one subgroup of the first set of subgroups and at least one subgroup of the second set of subgroups having common time or frequency resources and being neighboured in time or frequency, filtering the first set of subgroups of time-frequency resource elements using a first filter characteristic defined by a first set of filter coefficients, filtering the second set of subgroups of time-frequency resource elements using a second filter characteristic defined by a second set of filter coefficients different from the first set of filter coefficients, and transmitting the multicarrier transmit signal, wherein if the wireless device experiences a link quality being lower than a threshold, then the transmitter apparatus uses the first set of subgroups of time-frequency resource elements, and if the wireless device experiences the link quality being higher than the threshold, then the wireless devices uses the second set of subgroups of time-frequency resource elements.

13. A base station comprising:
at least one processor; and
at least one memory including computer program code,
the at least one memory and the computer program code configured to, with the at least one processor, cause the base station at least to perform:
- transmitting information to a wireless device about a first set of subgroups of time-frequency resource elements which can be used by the wireless device if the wireless device experiences a link quality being lower than a threshold,
- transmitting information to the wireless device about a second set of subgroups of time-frequency resource elements which are used by the wireless device if the wireless device experiences the link quality being higher than the threshold, with at least one subgroup of the first set of subgroups and at least one subgroup of the second set of subgroups having common time or frequency resources and being neighboured in time or frequency.

14. The base station according to claim 13, wherein the base station determines whether said wireless device experiences the link quality being lower than said threshold or being higher than said threshold.

* * * * *